United States Patent [19]
Morris et al.

[11] Patent Number: 5,867,931
[45] Date of Patent: Feb. 9, 1999

[54] FISHING ROD ELECTRICAL AUDIO-VISUAL STRIKE ALARM

[76] Inventors: Brian G. Morris, 10806 Sagewillow, Houston, Tex. 77089; Jerry G. Morris, 9555 Tree Bridge, Houston, Tex. 77075

[21] Appl. No.: 789,824

[22] Filed: Jan. 28, 1997

Related U.S. Application Data

[60] Provisional application No. 60/013,279 Mar. 12, 1996.

[51] Int. Cl.$^6$ .................................................. A01K 97/12
[52] U.S. Cl. .................................................... 43/17; 43/25
[58] Field of Search .................................... 43/4.5, 17, 25

[56] References Cited

U.S. PATENT DOCUMENTS

| | | | |
|---|---|---|---|
| 2,196,784 | 4/1940 | Simmons | 43/17 |
| 2,814,900 | 12/1957 | Frazier | 43/17 |
| 2,816,387 | 12/1957 | Crowe | 43/17 |
| 3,216,142 | 11/1965 | Kricksfeld | 43/17 |
| 3,283,438 | 11/1966 | Wagner | 43/17 |
| 4,133,130 | 1/1979 | Young | 43/17 |
| 4,398,185 | 8/1983 | Roberts | 340/573 |
| 4,471,555 | 9/1984 | Soukup | 43/17 |
| 4,633,608 | 1/1987 | Savarino | 43/17 |
| 5,088,223 | 2/1992 | Chu | 43/17 |
| 5,261,180 | 11/1993 | Foster | 43/17 |
| 5,321,903 | 6/1994 | Ebener | 43/17 |
| 5,396,726 | 3/1995 | Zepeda | 43/17 |

*Primary Examiner*—Jack W. Lavinder

[57] ABSTRACT

A self-contained, battery operated fishing line tension detector and alarm system that adapts to a conventional fishing rod, reel, and line assembly. The system detects the feeding activity or strike of a fish by detecting the related change in the tension of the line. Engagement and disengagement of the line takes place without the person fishing having to handle the line. The strike alarm holds the line in an offset, unnatural position until the pull of a striking fish straightens the line which rotates a sensing arm until it touches an electrical contact; thus completing an electrical circuit which provides power for audible and visible alarms. Sensitivity to line tension is adjustable. Alarming occurs whenever line tension is above a sensitivity set point. The alarms are independent of each other and can be selectively switched in or out of the circuit. The visible alarm is illuminated for night visibility. The system is adaptable to a wide range of fishing techniques and types and sizes of rods and reels.

14 Claims, 5 Drawing Sheets

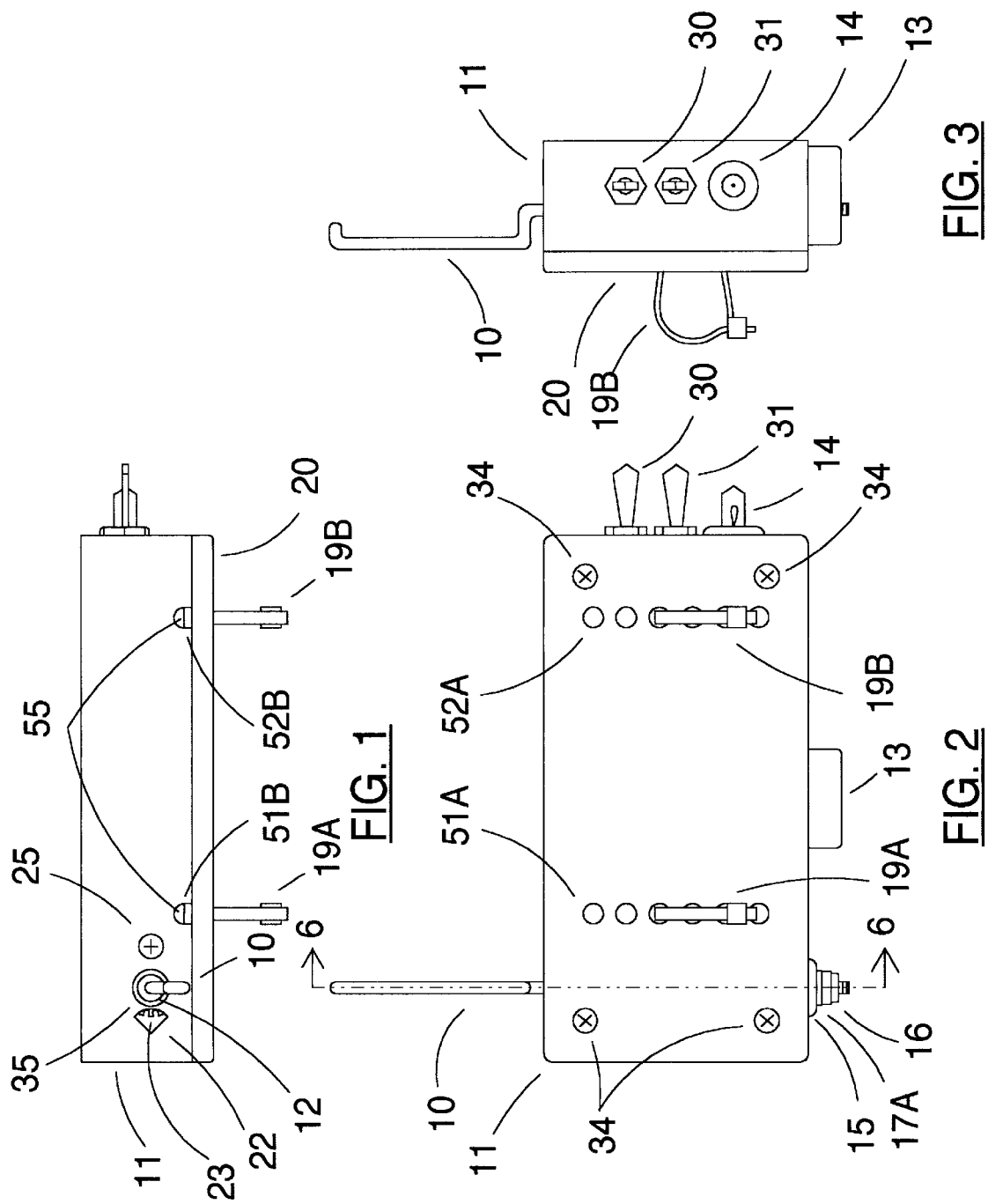

FISHING ROD ELECTRICAL AUDIO-VISUAL STRIKE ALARM

This application claims priority to the provisional patent application Ser. No. 60/013,279, filed Mar. 12, 1996.

BACKGROUND

1. Field of the Invention

The present invention or strike alarm relates to electrical devices, for use with conventional fishing rods and reels, that alert a person fishing of the feeding activity of a fish either nibbling or striking at bait connected to a fishing line.

2. Description of Prior Art

In order to alert the person fishing, most conventional fishing reels have mechanisms that mechanically produce a metallic clicking sound when line is stripped from the reel's spool causing the spool to rotate in a direction opposite to that used during line retrieval. Many reels, notably spin cast and open face spinning reels, require an anti-reverse spool mechanism to be engaged in order to get the clicking sound. Unfortunately, with the anti-reverse engaged a substantially strong fish strike is required to overcome the preset spool drag and achieve the clicking sound. Thus there is a need for more sensitive strike detection. All clicking mechanisms are similar in sound and not substantially loud. Thus there is a need for more distinctive alarm devices.

There have been many patents issued for electrically operated alerting devices with provisions for mounting on a fishing rod. However, they are rarely seen in tackle shops, at trade shows, or in use. This indicates that no one has developed an economical device with the right combination of features.

All devices of the prior art that are based on sensing changes in line tension require handling of the fishing line for engagement of the device with the line following casting. Handling of the line can be a hazardous undertaking if a large game fish rips line from the fishing reel at that moment. Many devices of the prior art require handling of the fishing line to disengage the line from the device before fighting a fish or making a second cast. In addition, prior art devices suffer one or more of the following disadvantages:

(a) The alarms are not self resetting following the detection and signaling of slight feeding activity; a disadvantage because the device's alarms should indicate each nibble but be silent when the stimulus ceases to exist. Additionally, battery power is being consumed until the alarms are reset.

(b) The alarms lack independent isolation switches. Thus the options available to the person fishing are limited.

(c) No detection sensitivity adjustment is provided, thus limiting the use to a specific type of fishing activity and specific fishing conditions.

(d) A fixed attitude or orientation of the fishing rod is required for proper operation, thereby encumbering conventional hand-held use.

(e) Detection of fish feeding activity requires line to be stripped from the reel, or the rod to be vibrated or flexed.

(f) The device is heavy or mounts near the slender end of the rod and changes the feel and action of the fishing rod.

(g) The device will mount on a variety of rods, but is not adaptable to the variable fishing line location of different rod and reel sizes and types. Thus the person fishing must handle the line to relocate it for engagement with the device.

(h) The device was designed for mounting separately from a fishing rod, and provisions for mounting on a fishing rod are lacking in practicality. When put to use on a rod the device would prove to be cumbersome.

(i) The device is mechanically complicated, or has parts that would be uneconomical to manufacture.

OBJECTS AND ADVANTAGES

An object of the strike alarm is to detect the feeding activity of a fish either nibbling or striking at bait, by sensing the related change in tension of a fishing line; and to signal the person fishing of the occurrence. Further objects:

(a) To be self-contained and battery operated.

(b) To provide a capability for engaging and disengaging the strike alarm with a fishing line without the person fishing having to handle the line.

(c) To automatically silence the alarm signals when detected fish feeding activity has ceased; and to signal again if feeding activity resumes.

(d) To provide selectable audible and/or visible alarm signals with independent isolation switches. An audible signal allows the person fishing to be looking away from the fishing rod yet be made aware of the fish feeding activity. A visible, illuminated alarm allows silent signaling to avoid disturbing others at night. Having an illuminated alarm also provides a method of distinguishing which of several rods in close proximity to one another, would be the one alarming audibly. Independent switches allow for disabling of all alarms for transport and storage.

(e) To provide a range of sensitivity that allows the slightest of fish feeding activity to be detected if desired, yet provides the capability to preclude all but the strongest of fish strikes from actuating the alarm system.

(f) To operate properly regardless of the physical orientation of the rod, reel, and line assembly (g) To detect fish feeding activity by monitoring line tension alone; and to provide detection without requiring line to be stripped from the reel, or the rod to be flexed.

(h) To be light in weight, and to mount near the rod handle to preserve the normal feel and action of the fishing rod when casting and playing a fish.

(i) To be adaptable to a variety of rod and reel sizes and types, while maintaining the heretofore mentioned object of engaging and disengaging the fishing line without the person fishing having to handle the fishing line.

(j) To function without encumbering normal use of the rod and reel, whether the person fishing uses a rod holder, leans the rod against a structure, or holds the fishing rod in a conventional manner.

(k) To be of simple construction and economical to manufacture.

DRAWING FIGURES

FIGS. 1, 2 and 3 are top, side, and end views respectively of a strike alarm according to the present invention.

Figure 7:
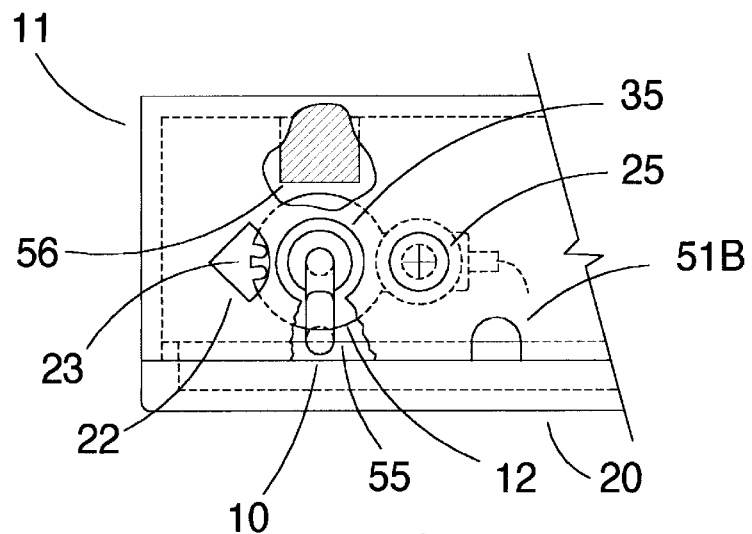

FIG. 7 enlarged partial top view of a strike alarm assembly showing a sensing arm, an electrical contact, and an adjustment aperture.

Figure 8:
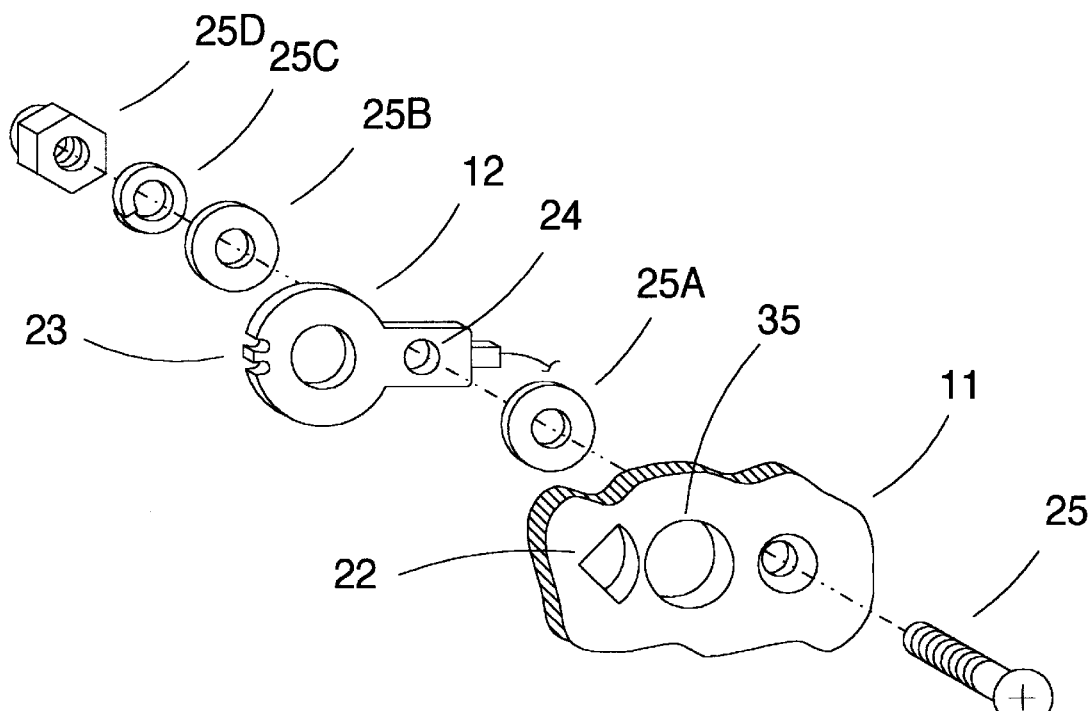

FIG. 8 is an exploded view of a subassembly of an electrical contact and an alarm housing.

| Reference Numerals in Drawings | | | |
|---|---|---|---|
| 10 | sensing arm | 11 | housing |
| 12 | electrical contact | 13 | buzzer |
| 14 | lamp | 15 | elastic hinge |
| 16 | sensitivity adjustment stop-nut | 17A | washer |
| 17B | washer | 18 | ring terminal subassembly |
| 18A | electrical ring terminal | 18B | ring terminal stop-nut |
| 18C | ring terminal stop-nut | 18D | ring terminal spring |
| 19A | mounting strap | 19B | mounting strap |
| 20 | cover | 22 | adjustment aperture |
| 23 | adjustment slots | 24 | pivot point |
| 25 | arbor screw | 25A | arbor screw flat washer |
| 25B | arbor screw flat washer | 25C | arbor screw spring washer |
| 25D | arbor screw stop-nut | 28 | battery |
| 29 | momentary switch | 30 | buzzer isolation switch |
| 31 | lamp isolation switch | 32 | electrical resistor |
| 33 | electrical resistor | 34 | cover screw |
| 35 | aperture | 40 | fishing rod |
| 42 | fishing line | 46 | line guide |
| 51A | adapting hole series | 51B | adapting slot |
| 52A | adapting hole series | 52B | adapting slot |
| 55 | cover flange | 56 | housing shoulder |

DESCRIPTION—FIGS. 1 TO 8

Figure 4:
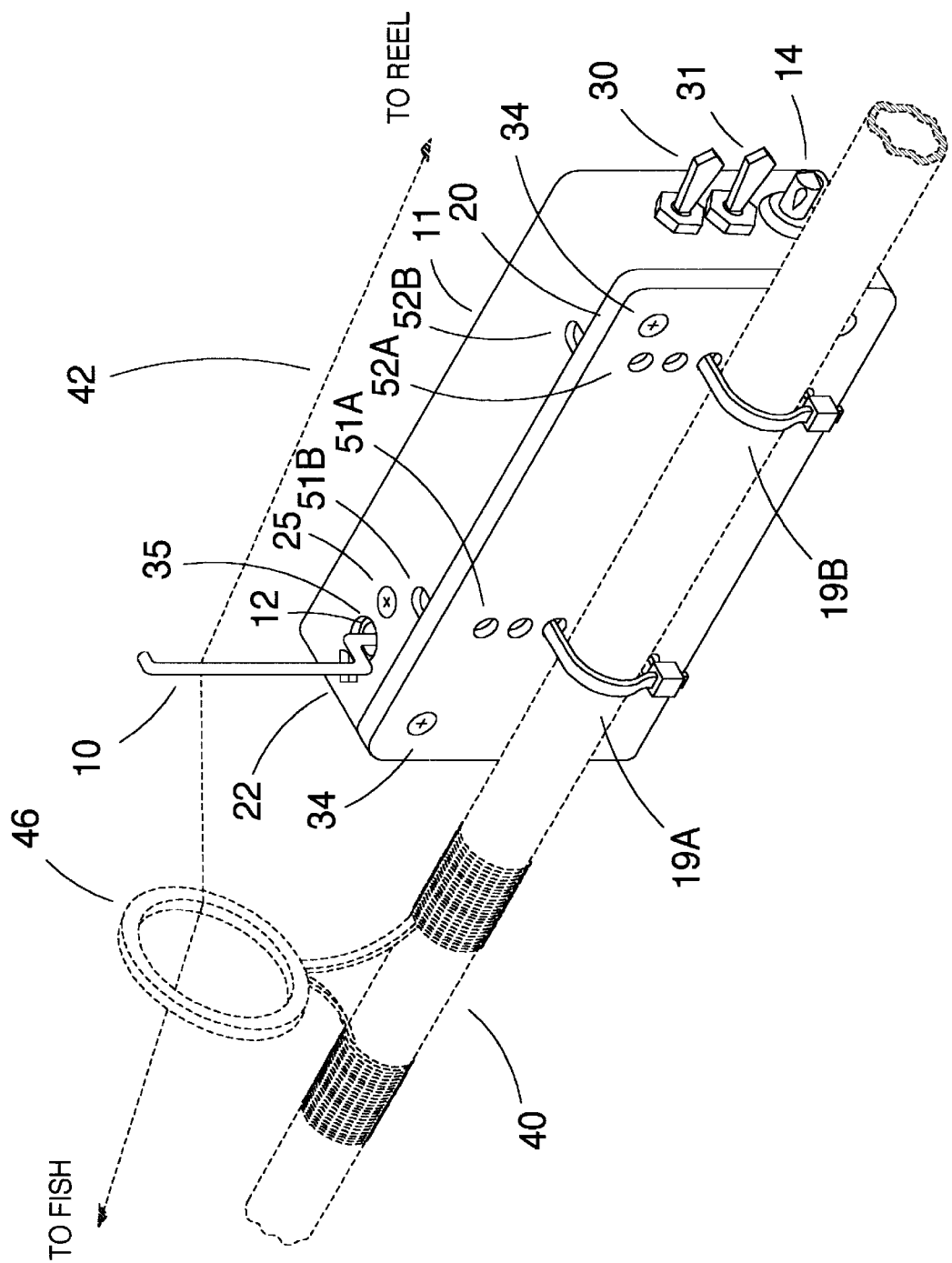
FIG. 4 is a pictorial view of one embodiment of a strike alarm according to the present invention, illustrating the installation of the strike alarm on a fishing rod and the engagement of a fishing line.
Figure 5:
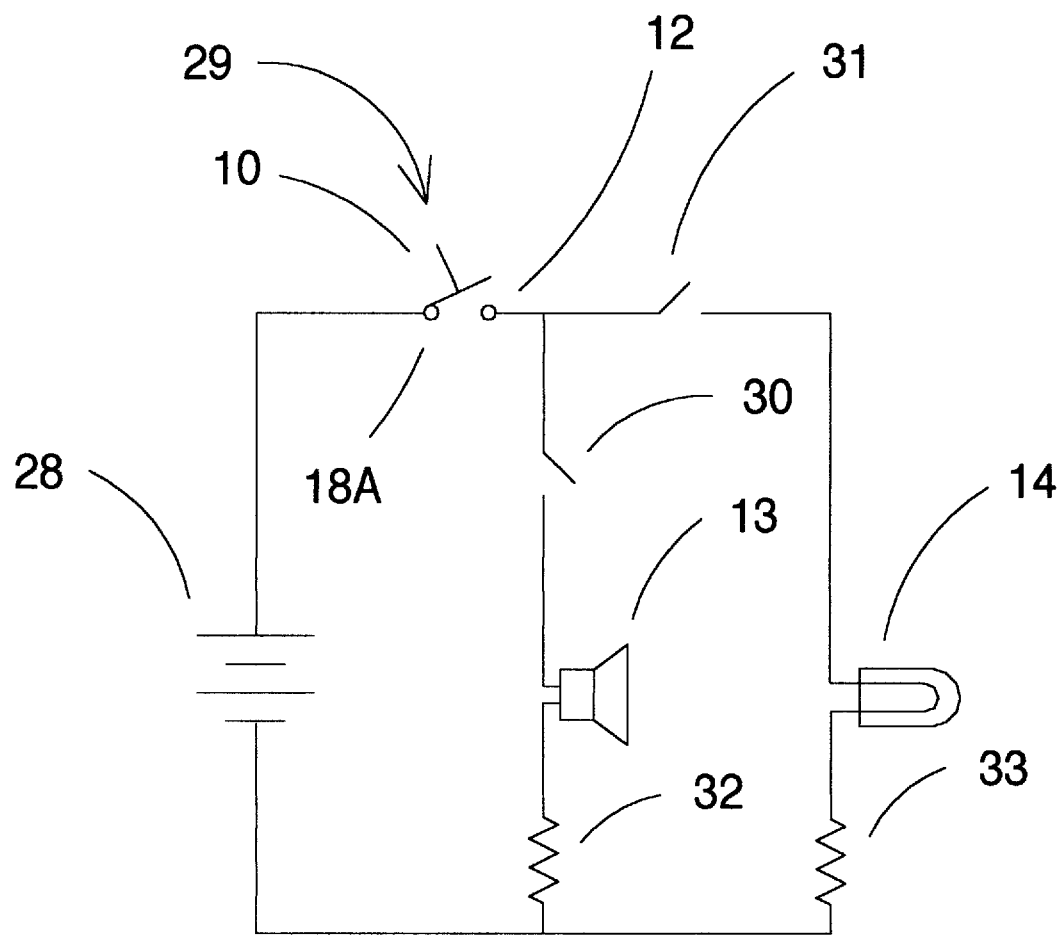
FIG. 5 is an electrical schematic, illustrating the operating and operated electrical components and their functional location in the circuit.

Several components of the system according to the present invention are illustrated in FIGS. 1, 2, and 3. The components include an electrically conductive sensing arm 10, a frame or housing 11, an electrical contact 12, and alarms consisting of a buzzer 13 and a lamp 14. FIG. 4 illustrates the strike alarm installed on a fishing rod 40 and engaging a fishing line 42. A line guide 46 is illustrated as the first line guide disposed from the fishing reel. When stimulated by fish feeding activity, tension in line 42 is increased, urging arm 10 and flexing an elastic hinge 15 (not shown in this figure) that secures arm 10 to housing 11; thereby arm 10 is rotated until it touches contact 12, closing an electrical circuit. In combination, arm 10, hinge 15, and contact 12 comprise a detecting mechanism. Referring to FIG. 5, the closed electrical circuit energizes a buzzer 13 and one or more lamps 14. Buzzer 13 can be any of a multitude of sound producing devices. Lamp 14 can be an incandescent lamp, a light emitting diode, or any of a multitude of illuminators.

Figure 6:
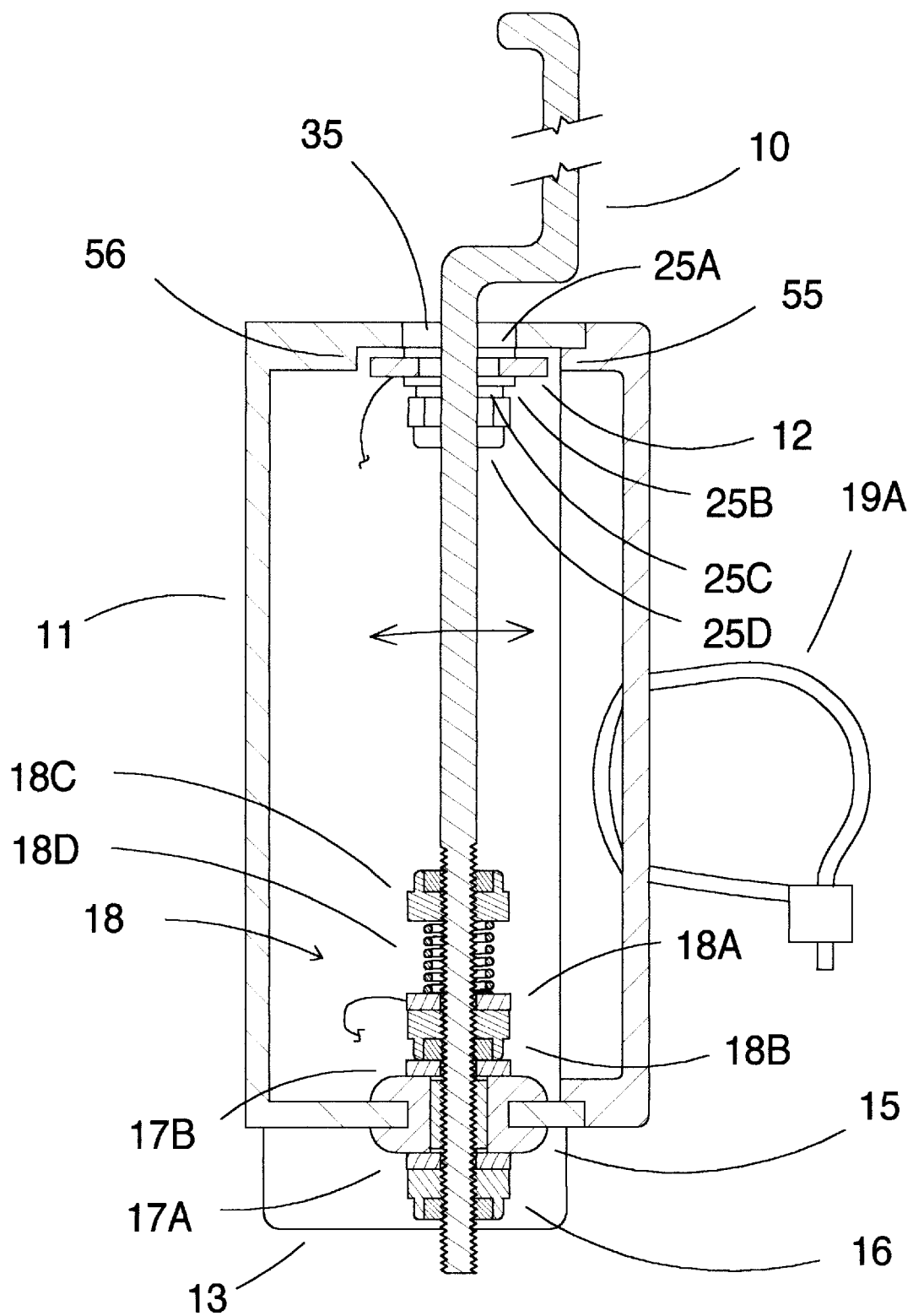
FIG. 6 is a cross section showing the installation of a detecting mechanism.

As illustrated in FIG. 6, the elastic hinge 15, which is an elastic electrical-chassis grommet, mounts in a mating hole in awall of housing 11. Arm 10 is tightly fitted (using a bushing if necessary) to a hole in hinge 15. A self-locking sensitivity adjustment stop-nut 16 facilitates changing the stiffness or bias of hinge 15, which is interposed between washers 17A and 17B. As nut 16 is rotated to increase the bias of hinge 15, washer 17B is prevented from slidably moving along the longitudinal axis of arm 10 by a sub assembly 18, consisting of electrical ring terminal 18A, its two retaining nuts 18B and 18C, and a spring 18D. In the absence of external urging the longitudinal axis of arm 10 is in a neutral position perpendicular to the wall in which it is mounted; and is concentric with an aperture 35 in the opposite wall of housing 11, through which it extends.

Referring to FIG. 8, contact 12, which is a ring-shaped electrical terminal, can be rotated about a pivot point 24 and an arbor screw 25. Screw 25 is fitted with two flat washers 25A, and 25B, a spring washer 25C, and a stop-nut 25D. Referring to FIG. 7, an adjustment aperture 22 in housing 11 provides access to adjustment slots 23 in contact 12, whereby a second strike alarm sensitivity adjustment is facilitated. A flange 55 on cover 20 and a shoulder 56 in housing 11 limit the rotation of contact 12.

Referring to FIG. 4, the strike alarm is attached to fishing rod 40 by mounting straps 19A and 19B that tie a cover 20 of housing 11 to rod 40. Two series of adapting holes 51A and 52A through cover 20 are used to anchor straps 19A and 19B respectively to cover 20. The end of each strap opposite the clasp passes through a first hole in cover 20 from the exterior surface of cover 20, returns through a second hole( in the same hole series), wraps around rod 40, and finally is threaded through its clasp. In a case where it is desired to locate rod 40 at the edge of cover 20 which is nearest line 42, straps 19A and 19B will utilize one hole in series 51A and 52A respectively. Each strap will pass through the hole, wrap around flange 55 and the edge of cover 20 then around rod 40, and finally will be threaded through its clasp. Slots 51B and 52B are provided in housing 11 to accommodate straps 19A and 19B respectively when cover 20 is subsequently installed on housing 11. Hole series 51A and 52A are used and in predetermined combinations to adapt the strike alarm to rods and reels of various sizes and types. Cover 20 is fastened to housing 11 by a set of cover screws 34. Housing 11 is perforated (perforations not shown) in a plurality of locations to preclude accumulation of water during a rainstorm.

Referring to FIG. 5, the electrical circuit is powered by a battery 28. Power from battery 28 is routed to momentary switch 29. Switch 29 shown in FIG. 5 is comprised of the combination of terminal 18A, arm 10 and contact 12, as shown in FIG. 6. Subassembly 18 acts as an electrical slip-ring, allowing arm 10 to be rotated about its longitudinal axis while terminal 18A remains in a generally fixed attitude. Terminal 18A is located on arm 10 near hinge 15, to minimize any physical affect that might be introduced to arm 10 by circuit wiring connected to terminal 18A. As heretofore stated the material of arm 10 is an electrical conductor. The material of housing 11 is an electrical insulator. Cover 20 can be made of either conducting or insulating material. Referring again to FIG. 5, power is routed to buzzer 13 through a buzzer isolation switch 30, and to lamp 14 through a lamp isolation switch 31. Resistors 32, and 33 are only required if the voltage rating of buzzer 13 and lamp 14 are not matched to the voltage supplied by battery 28.

OPERATION—FIGS. 4, 5, 6, 7, AND 8

Four options are available to adjust the strike alarm's detection sensitivity:

(a) Referring to FIG. 6, the bias of hinge 15 is adjusted by tightening or loosening nut 16 while grasping and holding (to prevent rotation) arm 10 at the end that engages line 42. Loosening increases detection sensitivity.

(b) Referring to FIGS. 7 and 8, contact 12 can be rotated about its pivot point 24 and arbor screw 25 to make contact 12 and arm 10 eccentric. Referring now to FIGS. 6 and 7, by rotating contact 12, the space or gap between contact 12 and arm 10 will increase on one side and decrease on the opposite side. Decreasing the gap, in the location where arm 10 and contact 12 meet during a strike, increases detection sensitivity. Referring to FIG. 7, aperture 22 in housing 11 provides access to slots 23 in contact 12, facilitating the gap adjustment. A small screwdriver, knife blade, ball point pen, fishing line snap or similar item can be utilized as a tool for this adjustment.

(c) Referring to FIG. 4, the location of the strike alarm on rod 40 relative to guide 46 can be adjusted. Detection sensitivity increases as the strike alarm approaches guide 46.

(d) Referring to FIG. 4, housing 11 can be rotated around the longitudinal axis of rod 40 to provide more or less lateral offset of line 42. The more offset, the more detection sensitivity.

Referring to FIG. 4, simple electrical wire-ties, made of plastic, are used as mounting straps 19A and 19B. When installing the strike alarm on rod 40 the straps are snugged up tightly by hand, with the strike alarm in the approximate location desired on rod 40. The strike alarm is then slidably moved back and forth along the axis of the tapered rod 40, until a location is found that provides the desired amount of rotational friction for engaging and disengaging line 42. With the proper amount of rotational friction, the strike alarm can easily be rotated about the longitudinal axis of rod 40 by the person fishing, yet the set attitude or position of the strike alarm will be maintained during normal operation and detection.

Cover 20 contains two series of holes which serve as securing points for the mounting straps. The holes are disposed such that, by selecting specific combinations of holes for straps 19A and 19B, housing 11 can be positioned on rod 40 in a conforming manner that assures that arm 10 can be engaged with line 42 without the person fishing having to handle line 42.

Referring to FIG. 4, arm 10 has a predetermined cross-sectional shape such that, after the strike alarm has been installed and properly offset, the person fishing merely has to rotate the strike alarm housing on the axis of rod 40 to engage or disengage line 42.

Referring to FIG. 4, cover 20 can be removed from housing 11 for replacement of battery 28 without disturbing the detecting mechanism or the electrical circuit. Additionally, if rod 40 is not blocking access to cover screws 34, the interface to rod 40 need not be disturbed.

Referring to FIGS. 6 and 7, in the case of overload from an external stimulus, arm 10 is supported by contact 12, which in turn is supported by flange 55 on cover 20 and shoulder 56 in housing 11. The limited rotation of arm 10 precludes damage to hinge 15.

Referring to FIG. 5, power is only consumed from battery 28 during alarming. Switches 30 and 31 may be opened, for transport and stowage, to preclude draining power from battery 28 if arm 10 is urged against contact 12.

SUMMARY, RAMIFICATIONS, AND SCOPE

Accordingly, the reader will see that the strike alarm is a self-contained, battery operated, fishing line tension detector and alarm system. The detecting mechanism of the strike alarm is comprised of a sensing arm, an elastic hinge, and an electrical contact. The arm is pivotably secured to the strike alarm's housing by way of the elastic hinge. The arm holds the line in an offset, unnatural position until the urging of a striking fish straightens the line and rotates the arm until it touches the electrical contact; thus closing an electrical circuit which provides power for audible and visible alarms.

Following a detection and closing of the electrical circuit, the elastic hinge provides a restoring moment that rotates the arm away from the electrical contact when line tension falls below a previously set sensitivity level, whereby the alarms are silenced. Thus no manual resetting of the detecting mechanism or electrical circuit is required. Alarming will resume if increased tension resumes. The person fishing thereby will hear and/or see a signaling pattern that indicates a type of feeding activity and, if knowledgeable, will set the hook at the appropriate time. The alarms are independent of each other; either or both can be selected in or out of the electrical circuit. The visible alarm is illuminated for night visibility and for distinguishing which of several fishing rods would be the one sounding an audible alarm. Battery power is only consumed during alarming. The alarm switches may be opened for transport and stowage, to assure no inadvertent alarming occurs.

The housing of the strike alarm is rotated on the longitudinal axis of the rod, by the person fishing, to engage or disengage the arm and the line. No handling of the line is required.

The long sensing arm allows the slightest of urging by a nibbling fish to provide substantial torque for flexing of the elastic hinge. A major portion of the arm is contained within the strike alarm housing. In case of physical overload, the contact will support the long, slender arm at the point where it exits the housing through a hole in the contact. Thus sensitivity can be optimized while maintaining ruggedness. Closing of the electrical circuit only requires overcoming the bias of the elastic hinge. There is no detent. The bias of the hinge is varied by adjusting a stop-nut on the arm. The nut compresses the hinge between two members on the arm.

There are four options available for adjustment of the sensitivity to line tension, providing adaptability to a wide range of fishing techniques, and types and sizes of rods and reels. As described heretofore, two options involve adjustment of strike alarm subassemblies, and two involve the disposition of the strike alarm on the fishing rod. The adjustable range of sensitivity allows the slightest of fish feeding activity to be detected if desired, yet provides the capability to preclude all but the strongest of fish strikes from actuating the alarm system.

No special orientation or attitude of the rod is required for the strike alarm to operate properly. An increase in line tension is all that is necessary for detection to take place; no stripping of line from the reel is necessary and no flexing or of the fishing rod is required.

The strike alarm is adaptable to all conventional fishing rods and reels. It mounts on the rod between the reel and the first line guide disposed from the reel, conforming to the line location. The capability to engage or disengage the strike alarm with the fishing line is maintained regardless of the size or type of rod and reel. The strike alarm is small and light-in-weight and has no encumbering affect on the conventional use, feel, and action of the rod and reel.

The strike alarm's housing cover can be removed from the housing for battery replacement without disturbing the detecting mechanism, or the electrical circuit.

Additionally, the fishing rod can be placed in a rod holder, or leaned against any desired support including the rail of a fishing pier or the gunwale of a boat.

As the reader has seen, the strike alarm is simple of construction and light-in-weight; indicating that it would be economical to manufacture.

Although the description above contains many specificities, these should not be considered as limiting the scope of the invention but as merely providing illustrations of some of the presently preferred embodiments of this invention. For example, in lieu of the simple plastic, electrical wire-ties, other types of straps including metal straps, straps with hook and loop fasteners and gear or screw tightened clamps could be used; in lieu of holes through the cover, loops on the upper surface of the cover and outer surface of the housing could be used as securing points for the mounting straps; in lieu of a hexagonal nut with wrench flats, a wing nut could be used as the sensitivity adjustment nut, etc.

Thus the scope of the invention should be determined by the appended claims and their legal equivalents, rather than by the examples given.

I claim:

1. A fishing line tension detector and alarm system that mounts on substantially any type of fishing rod, reel, and line assembly, and including:

(a) a housing;

(b) mounting strap means secured to said housing and wrapped around said rod;

(c) adapting means for repositioning said mounting straps on said housing whereby said system can be conformed to said rod, reel, and line assembly;

(d) a line tension detecting mechanism comprised of an elastic hinge secured to one wall of said housing, an electrically conductive sensing arm secured at one of it's ends to said elastic hinge and extending transversely across the interior of said housing and passing with clearance through an aperture in an electrical contact secured to an opposite wall of said housing, said arm further extending with clearance through an aperture in said opposite wall of said housing in position to engage said fishing line;

(e) audible and visible alarms;

(f) an electrical circuit including a battery, said sensing arm, said electrical contact, and said alarms, said circuit being wired whereby said battery energizes said arm, and when said arm touches said contact said alarms are energized;

(g) switches for selecting either or both of said audible and visible alarms to be in or out of said electrical circuit; and, (h) a plurality of means for adjusting the sensitivity of said system to said line tension.

2. The system as set forth in claim 1 wherein said visible alarm further includes illuminating means, whereby night visibility is provided.

3. The system as set forth in claim 2 wherein said sensing arm is threaded at one of it's ends, said threaded end being fitted to said elastic hinge snugly through an aperture in said hinge and secured to said hinge by threaded members sandwiching said hinge, said threaded members providing compression means for adjusting the bias of said elastic hinge, thereby adjusting the sensitivity of said line tension detecting mechanism.

4. The system as set forth in claim 1 wherein structural means are provided to preclude damage to said elastic hinge in case of physical overload applied to said sensing arm.

5. The system as set forth in claim 1 wherein said mounting strap means further include tightness adjustment means, whereby a tightness setting may be found that will facilitate slidably or rotatably relocating said system on said rod, whereby the sensitivity of said system to said line tension is adjusted.

6. The system as set forth in claim 1 further including gap adjustment means for changing the physical gap created by said clearance between said sensing arm and said electrical contact, whereby the sensitivity of said system to changes in said line tension is adjusted.

7. The system as set forth in claim 1 wherein said elastic hinge inherently provides a restoring farce that rotates said arm away from said electrical contact when said line tension falls below a previously set sensitivity level, whereby said alarms are silenced.

8. The system as set forth in claim 1 wherein said line tension detection mechanism is provided for detection of a change in said line tension independent of the rotation of a spool on said reel, the flexing of said rod, or the physical orientation of said rod, reel, and line assembly.

9. The system as set forth in claim 1 wherein said mounting strap and adapting means in combination provide the person fishing the ability to engage and disengage said sensing arm with said line by rotating said housing about the longitudinal axis of said rod.

10. The system as set forth in claim 1 wherein said mounting strap means further include tightness adjustment means, whereby a tightness setting may be found that will facilitate slidably or rotatably relocating said system on said rod, whereby the sensitivity of said system to said line tension is adjusted.

11. The system as set forth in claim 1 wherein said elastic hinge inherently provides restoring means that rotate said arm away from said electrical contact when said line tension falls below a previously set sensitivity level, whereby said alarms are silenced.

12. A fishing line tension detector and alarm system that mounts on substantially any type of fishing rod, reel, and line assembly between said reel and a first line guide disposed from said reel, and includes:

(a) a housing with means for accommodating components and subassemblies of said system;

(b) mounting strap means secured to said housing and wrapped around said rod, the tightness of said straps controlling rotational friction, whereby said housing can easily be rotated about the longitudinal axis of said rod by the person fishing, yet a set attitude and position of the system will be maintained during normal operation and detection;

(c) adapting means for repositioning said straps on said housing, whereby said system can be laterally offset from the longitudinal axis of said rod as required to engage an electrically conductive sensing arm with said line;

(d) a detecting mechanism consisting of a grommet-like elastic hinge elastically secured to a hole through one wall of said housing, said sensing arm, said arm being threaded at one of it's ends, said threaded end being fitted snugly through an aperture in said hinge and secured to said hinge by threaded members sandwiching said hinge, said arm extending transversely across the interior of said housing and passing with clearance through an aperture in an electrical contact secured to said housing, said arm further extending with clearance through an aperture in the opposite wall of said housing in position to engage said fishing line;

(e) independently selectable/deselectable, electrical, audible and illuminated alarms;

(f) an electrical circuit including a battery, said sensing arm, said electrical contact, said alarms, and alarm isolation switches, said circuit being wired whereby said battery energizes said arm, and when said arm touches said contact said alarms are energized;

(g) a plurality of means for adjusting the sensitivity of said system to said line tension.

13. The system as set forth in claim 12 wherein said threaded members on said sensing arm are arranged for compressing said elastic hinge, thereby changing the bias of said hinge, whereby the sensitivity of said detecting mechanism is adjusted.

14. The system as set forth in claim 12 wherein said mounting strap and adapting means in combination provide the capability to engage and disengage said sensing arm with said line by rotating said housing on said rod.

* * * * *